(12) United States Patent
Ono et al.

(10) Patent No.: US 8,607,658 B2
(45) Date of Patent: Dec. 17, 2013

(54) HORIZONTAL ARTICULATED ROBOT

(75) Inventors: Masatoshi Ono, Suwa (JP); Christoph Meyerhoff, Nordrhein-Westfalen (DE)

(73) Assignee: Seiko Epson Corporation (JP)

( * ) Notice: Subject to any disclaimer, the term of this patent is extended or adjusted under 35 U.S.C. 154(b) by 392 days.

(21) Appl. No.: 12/547,533

(22) Filed: Aug. 26, 2009

(65) Prior Publication Data

US 2010/0050806 A1    Mar. 4, 2010

(30) Foreign Application Priority Data

Sep. 1, 2008   (JP) .................................. 2008-223868

(51) Int. Cl.
    *B25J 17/00*    (2006.01)
(52) U.S. Cl.
    USPC ....................................................... 74/490.01
(58) Field of Classification Search
    USPC ........................ 74/490.01, 490.02; 901/27–29
    See application file for complete search history.

(56) References Cited

U.S. PATENT DOCUMENTS

| | | | |
|---|---|---|---|
| 4,907,467 A | | 3/1990 | Toyoda et al. |
| 5,000,653 A | * | 3/1991 | Gosdowski ................ 414/744.5 |
| 5,577,414 A | | 11/1996 | Ogawa et al. |
| 5,761,965 A | | 6/1998 | Dahlquist |
| 6,199,444 B1 | | 3/2001 | Wakaizumi et al. |
| 6,439,076 B1 | * | 8/2002 | Flemmer .................... 74/490.03 |
| 6,737,826 B2 | | 5/2004 | Gilchrist |
| 2005/0087034 A1 | * | 4/2005 | Friedrich et al. ........... 74/490.03 |
| 2005/0166699 A1 | * | 8/2005 | Meyerhoff et al. ........ 74/490.01 |
| 2005/0193854 A1 | | 9/2005 | Sanemasa |
| 2005/0204849 A1 | | 9/2005 | Yamamoto et al. |
| 2008/0016979 A1 | | 1/2008 | Yasumura et al. |
| 2009/0007713 A1 | * | 1/2009 | Meyerhoff et al. ........ 74/490.01 |
| 2012/0279341 A1 | | 11/2012 | Ono et al. |

FOREIGN PATENT DOCUMENTS

| | | |
|---|---|---|
| JP | 62-166978 | 7/1987 |
| JP | 03-003784 | 1/1991 |
| JP | 03-003784 U | 1/1991 |
| JP | 2001-113478 | 4/2001 |
| JP | 2007-168004 | 7/2007 |
| JP | 2009-072895 | 4/2009 |

\* cited by examiner

*Primary Examiner* — Vicky Johnson
(74) *Attorney, Agent, or Firm* — Harness, Dickey & Pierce, P.L.C.

(57) ABSTRACT

A horizontal articulated robot includes a base, a first arm provided rotatably around a first rotation axis on the base, a second arm provided rotatably around a second rotation axis on the first arm, the second rotation axis being parallel to the first rotation axis, and a main shaft provided in the second arm to be extended in a direction parallel to the second rotation axis. A distance between the second rotation axis and the main shaft is shorter than a length of a straight line connecting the first and the second rotation axes. Additionally, the first arm has a recessed portion formed so as to include a position on a rotation path where a rotation radius around the second rotation axis is equivalent to the distance between the second rotation axis and the main shaft.

5 Claims, 7 Drawing Sheets

HORIZONTAL ARTICULATED ROBOT

BACKGROUND

1. Technical Field

The present invention relates to an industrial robot, and more particularly to a horizontal articulated robot having a plurality of horizontally rotating arms.

2. Related Art

Figure 12:
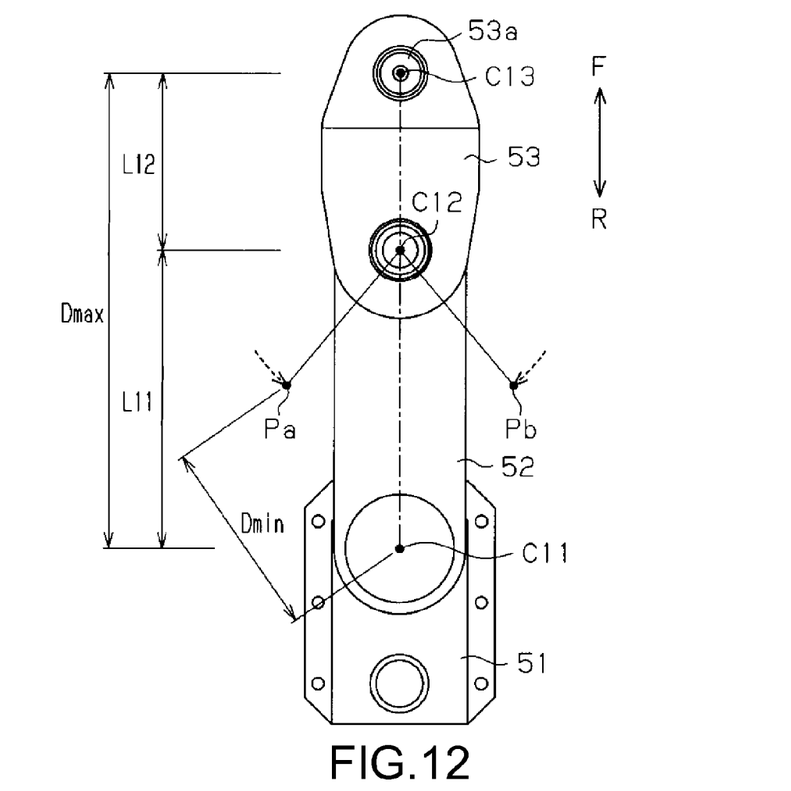
FIG. 12 is a plan view showing a top-surface structure of a conventional horizontal articulated robot.

Among industrial robots, there is known a SCARA robot (a horizontal articulated robot) with a plurality of arms sequentially connected by means of a horizontal articulation. FIG. 12 shows an example of a planar structure of a common SCARA robot having two arms.

As shown in FIG. 12, the SCARA robot includes a base 51, a first arm 52 having a base end portion horizontally rotatably connected to a base 51, and a second arm 53 having a base end portion connected to an extreme end portion of the first arm 52 by a horizontal articulation.

Figure 13:
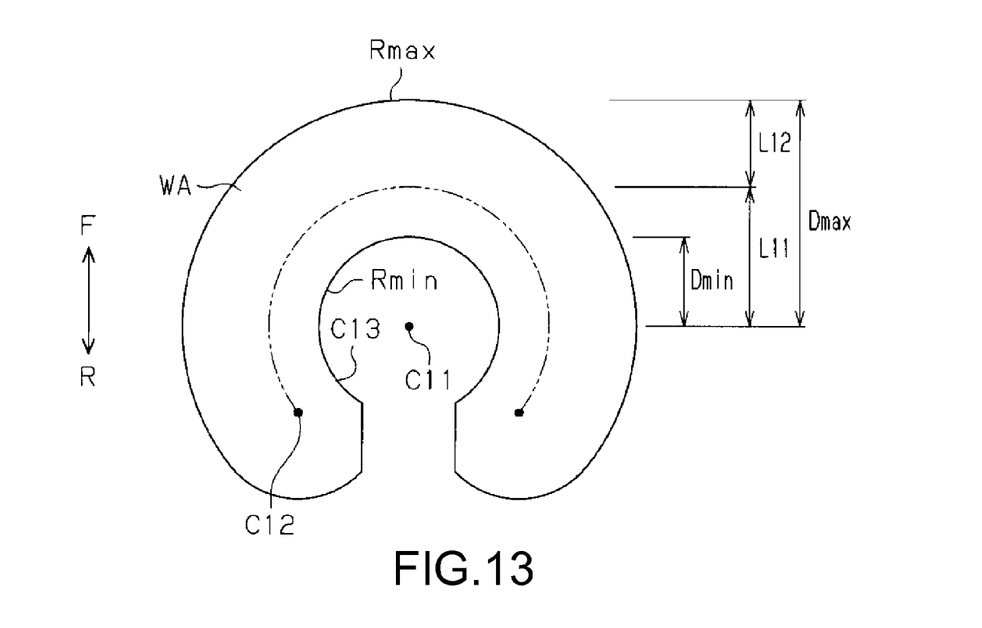
FIG. 13 is a regional view showing a planar path of each axis and a movable range of a main shaft in the conventional horizontal articulated robot.

FIG. 13 shows an outline of a movable range in the SCARA robot thus structured. As in the drawing, the first and the second arms 52 and 53 work together to move a working portion 53a disposed at an extreme end portion of the second arm 53 to an arbitrary position in a movable range WA formed between a maximum radius Rmax and a minimum radius Rmin. In other words, by using the working portion 53a at the extreme end portion, the SCARA robot can perform various operations for a target object (such as an article to be processed) located in the arbitrary position in the movable range WA.

Meanwhile, in the SCARA robot as above, the maximum radius Rmax defining the movable range WA is determined based on a maximum rotation radius Dmax obtained by adding an arm length L11 equivalent to a distance between a base rotation axis C11 of the first arm 52 and a connection rotation axis C12 of the second arm 53 to an arm length L12 equivalent to a distance between the connection rotation axis C12 and a working shaft C13 of the second arm 53. Similarly, the minimum radius Rmin defining the movable range WA is determined based on a minimum rotation radius Dmin equivalent to a distance between the base rotation axis C11 and a position Pa or Pb (See FIG. 12) where the working portion 53a can come closest to the base 51 without interfering with the first arm 52. In the arm structure thus provided, basically, the movable range WA is made largest when the minimum radius Rmin is set so as to be equivalent to a difference between the arm lengths L11 and L12. However, an arm frame of the first arm 52 is required to be large enough to maintain strength and rigidity for supporting the second arm 53 and others. Accordingly, miniaturization of the arm frame is restricted, and it is thus difficult to reduce the minimum radius Rmin.

Thus, in order to extend the movable range of such a SCARA robot, for example, there is proposed a conventional SCARA robot as in JP-A-2007-168004. The proposed SCARA robot includes a first arm horizontally rotatably mounted on a base and a second arm connected to the first arm by a horizontal articulation. The second arm is formed to be longer than the first arm. In other words, with respect to a maximum rotation radius of a working portion at an extreme end portion of the second arm obtained when both arms are linearly expanded, a minimum rotation radius of the working portion located in a position closest to the base by collapsing the second arm is reduced to increase the movable range in the SCARA robot.

On the other hand, the SCARA robot as above is generally expected not only to have as large a movable range as possible but also to have a more compact size, a high responsiveness, a high positioning precision, and the like.

In the SCARA robot proposed as above, however, although the movable range is surely extended, the second arm longer than the first arm naturally becomes larger in mass and inertia. This can deteriorate responsiveness upon movement and positioning precision.

SUMMARY

The present invention has been accomplished under the aforementioned background. An advantage of the invention is to provide a horizontal articulated robot that achieves a large mobility range while maintaining a high responsiveness, and a high positioning precision.

A horizontal articulated robot according to an aspect of the invention includes a base, a first arm provided rotatably around a first rotation axis on the base, a second arm provided rotatably around a second rotation axis on the first arm, the second rotation axis being parallel to the first rotation axis, and a main shaft provided in the second arm to be extended in a direction parallel to the second rotation axis, a distance between the second rotation axis and the main shaft being shorter than a length of a straight line connecting the first and the second rotation axes, and the first arm having a recessed portion formed so as to include a position on a rotation path where a rotation radius around the second rotation axis is equivalent to the distance between the second rotation axis and the main shaft.

In the horizontal articulated robot, the main shaft has the rotation path where the rotation radius around the second rotation axis is equivalent to the length of the second arm. The main shaft is movable to be positioned in such a manner that the main shaft enters into an eccentrically recessed region of the first arm. In other words, the movable range of the main shaft is extended by an amount of reduction in a minimum rotation radius with respect to the first rotation axis of the main shaft.

In addition, when compared with the conventional horizontal articulated robot having the first arm without any recessed portion, there is no change in the lengths of the first and the second arms in the robot of the aspect. This can minimize an increase in the mass of the first arm, as well as the second arm as in the conventional robot can be used without change. As a result, even when using the eccentric first arm as described above in the horizontal articulated robot, responsiveness, positioning precision, and the like can be maintained as in the conventional robot. Thus, there is no unnecessary increase in robot size.

Preferably, in the horizontal articulated robot, the recessed portion is formed by curving the first arm.

In the structure, the main shaft is movable to be positioned in such a manner that the main shaft enters into a curved portion of the first arm. Thereby, the main shaft can be received more smoothly in the curved portion according to a curving shape of the first arm.

Preferably, in the horizontal articulated robot, the first arm has the recessed portion at an intersection of the straight line and the rotation path in a rotation direction such that at least a part of the main shaft can be located on the intersection.

In the structure, a distance between the main shaft and the first rotation axis can be minimized, so that the minimum rotation radius of the main shaft with respect to the first rotation axis can be made smaller. In short, the movable range of the main shaft can be further extended.

Preferably, the horizontal articulated robot further includes a first connection shaft provided in the base in a manner protruding from the base, the first connection shaft rotating around the first rotation axis, and a second connection shaft provided in the second arm in a manner protruding from the second arm, the second connection shaft rotating around the second rotation axis, the first arm having a base end connection portion connected to the first connection shaft and an extreme end connection portion connected to the second connection shaft, the base end connection portion being formed so as to be connectable to the first connection shaft on both of horizontal surfaces of the first arm, and the extreme end connection portion being formed so as to be connectable to the second connection shaft on both of the horizontal surfaces of the first arm.

In the structure, even if the first arm having the recessed portion is reversed, the first arm can be connected to each of the first and the second rotation axes. Thus, in the horizontal articulated robot, configuration (structure) flexibility can be improved.

Preferably, the horizontal articulated robot further includes a wiring duct provided on the base to store wiring, the wiring duct being located in a position interfering with the recessed portion of the first arm rotated.

In the structure, when the second rotation axis of the first arm is located in a rear direction of the robot while sandwiching the wiring duct between the first and the second rotation axes, the movable range of the robot can be extended to a rear side of the base. Thereby, even in the horizontal articulated robot having the wiring duct in the position interfering with the first arm on the base, the movable range of the robot can be suitably extended.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described with reference to the drawings. Hereinafter, a horizontal articulated robot according to a first embodiment of the invention will be described in detail.

Figure 1:
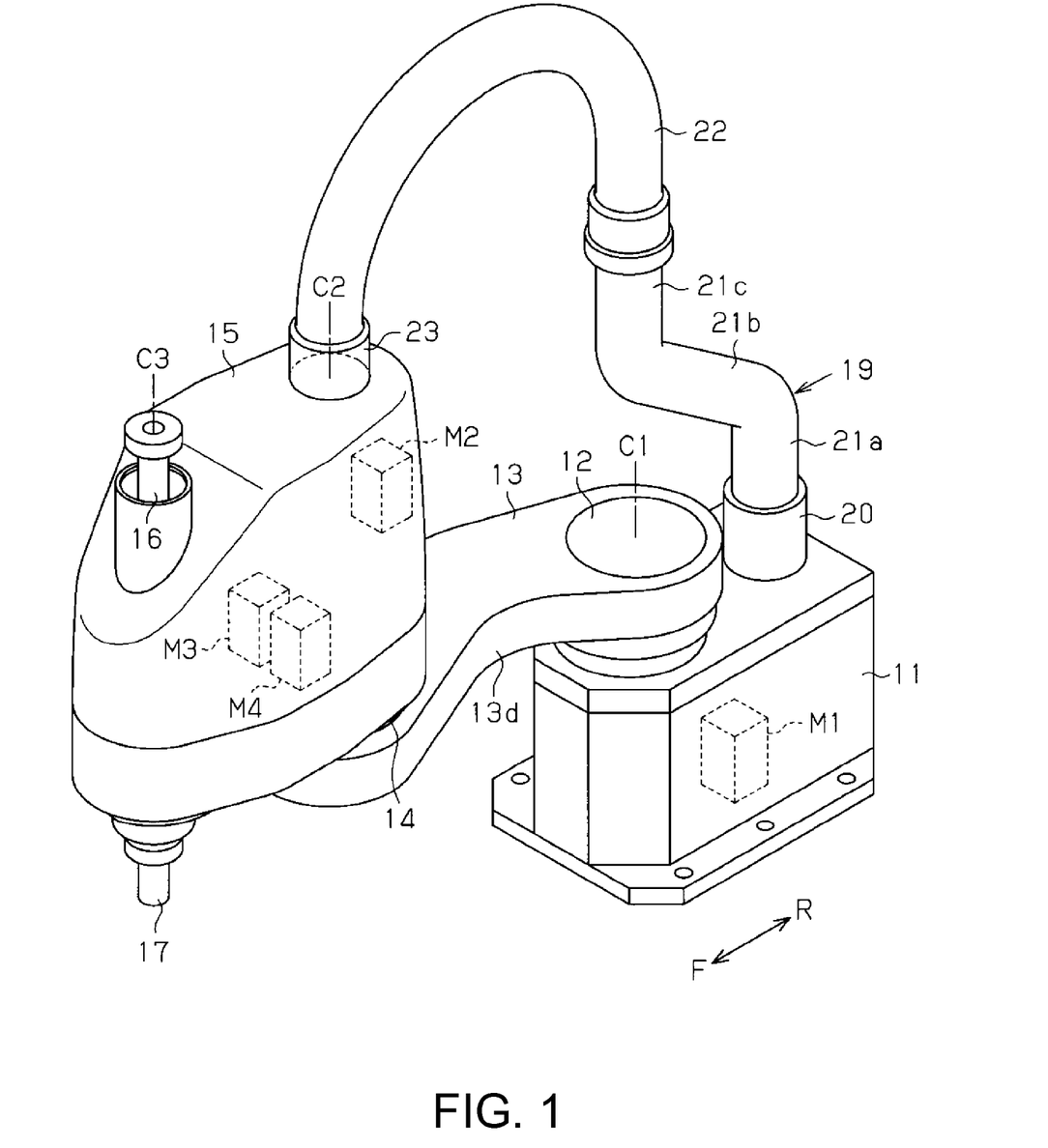
FIG. 1 is a perspective structural view of a horizontal articulated robot according to a first embodiment of the invention.
Figure 2:
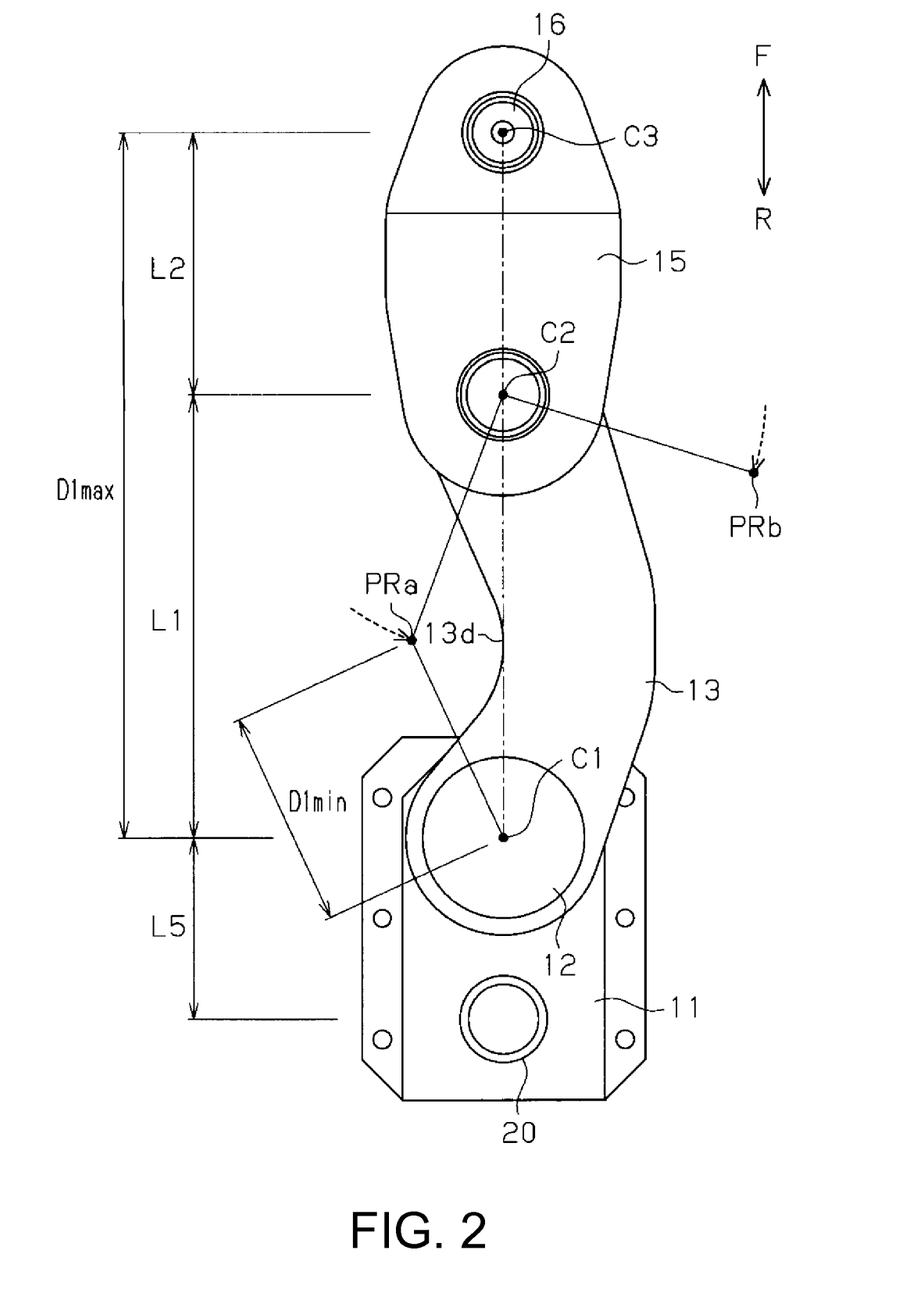
FIG. 2 is a plan view of a top-surface structure of the horizontal articulated robot of the first embodiment.

FIG. 1 shows a perspective structure of the horizontal articulated robot (a SCARA robot). FIG. 2 shows a top-surface structure of the SCARA robot.

As shown in FIG. 1, the SCARA robot includes a base 11 as a supporting member disposed on a floor or the like. At an upper end portion of the base 11 is provided a connection shaft 12 that rotatably supports a base end portion of a first arm 13, as a rotating member. The connection shaft 12 is formed in a cylindrical shape with an axial center C1 and is provided rotatably around the axial center C1 on the base 11. The connection shaft 12 is rotated forward or backward by a first motor M1 provided in the base 11. Thereby, the first arm 13 rotates around the axial center C1 of the connection shaft 12 rotated by the first motor M1, horizontally with respect to the base 11.

At an extreme end portion of the first arm 13, there is connected a support shaft 14 that rotatably supports a base end portion of a second arm 15, as a rotating member. The support shaft 14 is provided rotatably around an axial center C2 of the second arm 15 and drivenly connected to a second motor M2 disposed at the base end portion of the second arm 15 to be rotated forward or backward by the second motor M2. Thereby, the second arm 15 is rotated around the axial center C2 by a reaction force of the second motor M2, horizontally with respect to the first arm 13.

In the first embodiment, as shown in FIG. 2, a distance between the axial center C1 of the base end portion and the axial center C2 of the extreme end portion in the first arm 13 is set as an arm length L1, where the axial center C2 is rotated with a rotation radius of the arm length L1 with respect to the axial center C1. In addition, the first arm 13 is formed in a shape eccentric to a center line connecting the axial centers C1 and C2 to each other. In other words, in FIG. 2, the first arm 13 is formed such that a right side face of the arm 13 near a center part in a longitudinal direction of the arm 13 bulges rightward and a left side face thereof near the center part, which is opposite to the right side face thereof, is recessed rightward to form a recessed portion 13*d* so as to be eccentric to the center line. In short, the first arm 13 has, as it were, a rightward-curved shape.

Figure 3A:
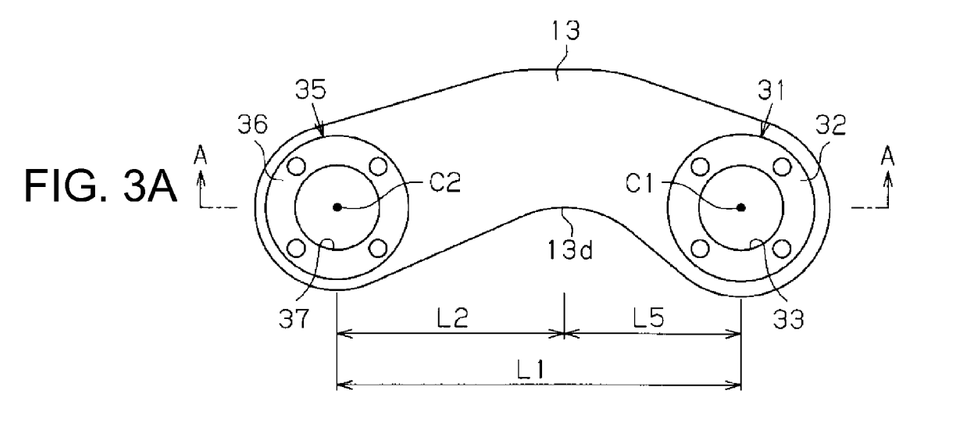
FIG. 3A is a plan view of a top-surface structure showing an arm structure of the horizontal articulated robot of the first embodiment.
Figure 3B:
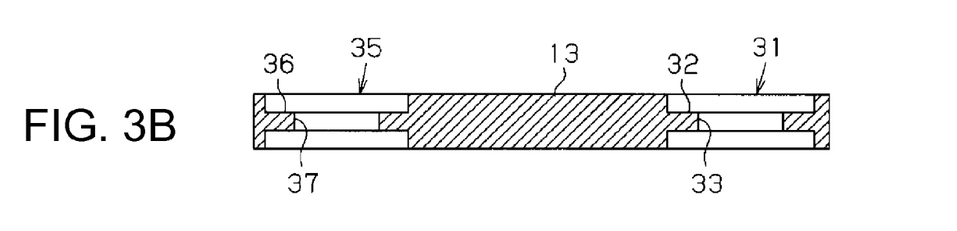
FIG. 3B is a sectional view showing a sectional structure taken along line A-A shown in FIG. 3A.
Figure 3C:
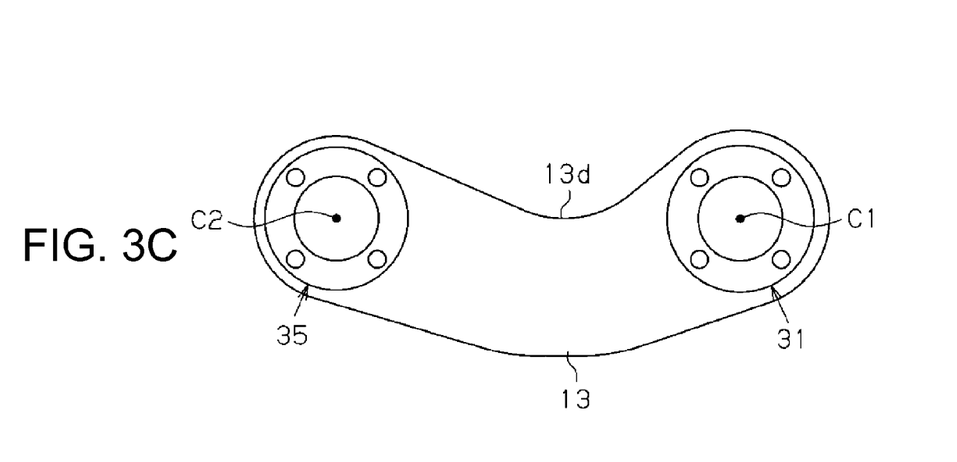
FIG. 3C is a bottom-surface view showing the arm structure of the horizontal articulated robot of the first embodiment.

FIGS. 3A, 3B, and 3C, respectively, show a top-surface structure of the first arm 13, a sectional structure taken along line A-A of FIG. 3A, and a bottom-surface structure of the first arm 13, respectively. In FIG. 3A, at the base end portion of the first arm 13, there is formed a base end connection portion 31, to which the connection shaft 12 is connectively fixed. The base end connection portion 31 is formed penetratingly in such a manner that a center of the base end connection portion 31 coincides with the axial center C1. Additionally, at the extreme end portion of the first arm 13, there is formed an extreme end connection portion 35, to which the support shaft 14 is connectively fixed. The extreme end connection portion 35 is formed penetratingly in such a manner that a center of the extreme end connection portion 35 coincides with the axial center C2.

In FIG. 3B, at a center of a thickness direction of the base end connection portion 31 is formed a protruded portion 33 protruding in a direction of the axial center C1. The connection shaft 12 inserted into the base end connection portion 31 is received by the protruded portion 33 to be connectively fixed to a screw hole, which is penetratingly formed on a side surface 32 of the protruded portion 33, by means of a screw connection or the like. The base end connection portion 31 thus formed has a same structure on both of the top and the bottom surfaces of the first arm 13, as shown in FIGS. 3A and 3C, so that the connection shaft 12 can be connectively fixed to each of the surfaces of the first arm 13. On an extreme end of the connection shaft 12, a cover is mounted so as to be flush with the top surface of the first arm in order to prevent a foreign object or the like from entering into the base end connection portion 31.

Additionally, at a center of a thickness direction of the extreme end connection portion 35 is formed a protruded portion 37 protruding in a direction of the axial center C2. The support shaft 14 inserted into the extreme end connection portion 35 is received by the protruded portion 37 to be connectively fixed to a screw hole, which is penetratingly formed on a side surface 36 of the protruded portion 37, by means of a screw connection or the like. The extreme end connection portion 35 thus formed has a same structure on both of the top and the bottom surfaces of the first arm 13, as shown in FIGS. 3A and 3C, so that the support shaft 14 can be connectively fixed to each of the surfaces of the first arm 13. On a bottom end of the support shaft 14, a cover is mounted so as to be flush with the bottom surface of the first arm in order to prevent a foreign object or the like from entering into the extreme end connection portion 35.

Thereby, regardless of which one of the top and the bottom surfaces of the first arm 13 is set as an upper surface, the connection shaft 12 and the support shaft 14 can be mounted on the first arm 13. In the present embodiment, the first arm 13 is formed so as to have the rightward-curved shape. Accordingly, by reversing a direction of the upper surface of the first arm, a curving direction of the first arm in a horizontal direction can be shifted leftward. Thus, using the first arm 13 thus formed allows the curving direction to be shifted either rightward or leftward by merely reversing the top and the bottom surfaces of the first arm 13.

On the extreme end portion of the second arm 15, a main shaft 16 is supported rotatably as a rotating member and movably in a vertical direction. The main shaft 16 is rotated forward or backward around the axial center C3 of the shaft 16 by forward or backward rotation of a third motor M3 provided in the second arm 15 and is vertically moved up and down by forward or backward rotation of an elevation motor M4 provided in the second arm 15. On a bottom end portion 17 of the main shaft 16 is mounted a hand-like tool to hold a conveyed object, whereby operations for a target object are performed using the tool moved up and down by elevation of the main shaft 16.

In the embodiment, the second arm 15 has an arm length L2 equivalent to a distance between the axial center C2 of the base end portion and the axial center C3 of the main shaft 16. The arm length L2 is made shorter than the arm length L1, and the axial center C3 is rotated with respect to the axial center C2 with a rotation radius of the arm length L2.

Thereby, when the first and the second arms 13 and 15 are linearly expanded, the rotation radius of the axial center C3 of the main shaft 16 with respect to the axial center C1 of the connection shaft 12 is equivalent to a maximum rotation radius D1max as a sum of the arm lengths L1 and L2. Meanwhile, the rotation radius of the axial center C3 is equivalent to a minimum rotation radius D1min as a distance between a left limit point PRa and the axial center C1 when the axial center C3 is located at the left limit point PRa so as to enter into the recessed portion 13*d* of the first arm 13. In this case, when a deepest part of the recessed portion 13*d* of the first arm 13 in the horizontal direction is formed at the arm length L2 from the axial center C2, the axial center C3 can become closest to a center line, whereby the minimum rotation radius D1min has a value closer to a possible shortest length (=L1−L2). In addition, in a bulging direction of the first arm, the axial center C3 is located at a right limit point PRb.

Signal lines for control signals and monitor signals of the motors M2 to M4 provided in the second arm 15 are gathered in the base 11 via a flexible wiring duct 19 to be connected to respective corresponding terminals of a not-shown control device, together with a signal line of the first motor M1. In FIG. 2, a part of the wiring duct 19 is omitted for convenience of description.

The wiring duct 19 includes a base-side duct connecting portion 20 and an arm-side duct connecting portion 23. The base-side duct connecting portion 20 is provided in a position horizontally apart by a length L5 (=L1−L2) from the axial center C1 to a rear side R of the base 11. The arm-side duct connecting portion 23 is provided around the axial center C2 on a top part of the second arm 15. The wiring duct 19 is formed so as to connect the base-side duct connecting portion 20 to the arm-side duct connecting portion 23. Specifically, the wiring duct 19 includes a base end portion 21*a* fixed to the base-side duct connecting portion 20 to be extended upward, a turning portion 21*b* extended from the base end portion 21*a* in a direction of the axial center C1 of the connection shaft 12, and an extreme end portion 21*c* having a duct center line collinear with the axial center C1 of the connection shaft 12 extended upward from the turning portion 21*b*. The base end portion 21*a* fixed to the base-side duct connecting portion 20 does not rotate, so that the duct center line of the extreme end portion 21*c* supported by the base end portion 21*a* via the turning portion 21*b* is constantly located collinearly with the axial center C1 of the connection shaft 12.

Between the extreme end portion 21*c* and the arm-side duct connecting portion 23 is provided a connection portion 22 in a traversing manner. An end of the connection portion 22 adjacent to the extreme end portion 21*c* is rotatably connected to the extreme end portion 21*c* around the axial center C1, and an end of the connection portion 22 adjacent to the arm-side duct connecting portion 23 is rotatably connected to the arm-side duct connecting portion 23 around the axial center C2. In other words, even when the first arm 13 is horizontally rotated with respect to the base 11, a distance between the duct center line of the extreme end portion 21c collinear with the axial center C1 and the axial center C2 as a center of the arm-side duct connecting portion 23 is maintained constant to be the arm length L1. Thereby, the connection portion 22 transversing between the extreme end portion 21c and the arm-side duct connecting portion 23 is formed such that a distance between the opposite ends of the connection portion 22 remains the arm length L1, without any change in the length. Due to no change in the distance between the opposite ends, the connection portion 22 is maintained to have a constant shape regardless of the horizontal rotation of the first arm 13. This can reduce fatigue and abrasion of a member caused by deformation of the shape or the like, resulting in improvement of durability.

In the embodiment, the length L5 by which the connecting portion 20 is located apart from the axial center C1 coincides with a distance between the axial center C1 and the recessed portion 13d of the first arm 13. Then, when the recessed portion 13d of the first arm 13 approaches, the center line of the first arm 13 comes closest to the base-side duct connecting portion 20. Thereby, even when the base-side duct connecting portion 20 is located in a position interfering with a moving plane of the first arm 13, the first arm 13 allows the axial center C2 of the extreme end portion and the second arm 15 connected to the axial center C2 to be located also on the rear side R of the base-side duct connecting portion 20.

Next will be described a movable range of the main shaft 16 of the horizontal articulated robot.

Figure 4A:
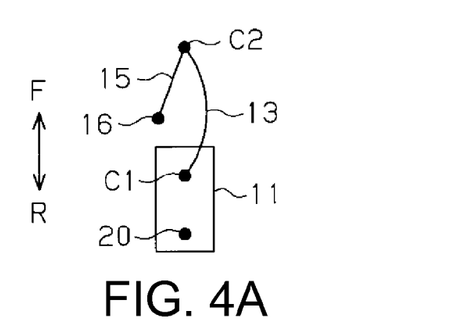
FIG. 4A is an illustrative view showing a movable range of a second arm of the horizontal articulated robot of the first embodiment when the second arm rotates counterclockwise.
Figure 4B:
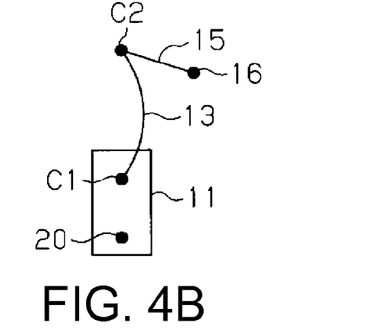
FIG. 4B is an illustrative view showing a movable range of the second arm of the horizontal articulated robot of the first embodiment when the second arm rotates clockwise.
Figure 5A:
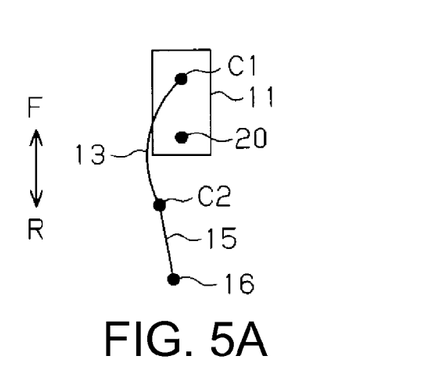
FIG. 5A an illustrative view showing a movable range of a first arm of the horizontal articulated robot of the first embodiment when the first arm rotates counterclockwise.
Figure 5B:
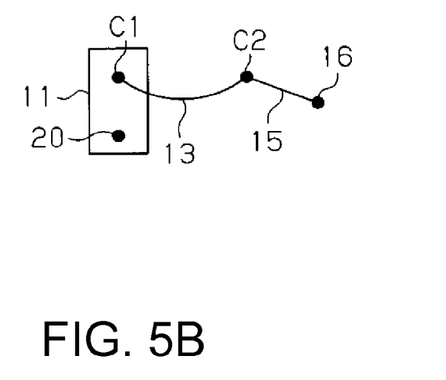
FIG. 5B is an illustrative view showing a movable range of the first arm of the horizontal articulated robot of the embodiment when the first arm rotates clockwise.
Figure 6:
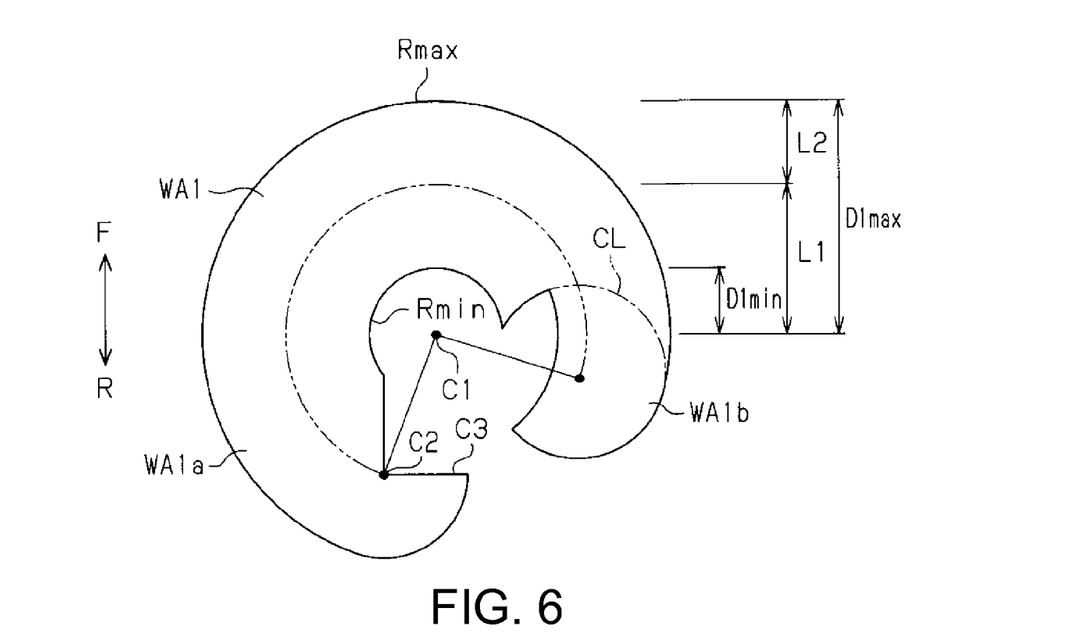
FIG. 6 is a regional view showing a planar path of each axis and a movable range of a main shaft in the horizontal articulated robot of the first embodiment.

With respect to the axial center C2, the main shaft 16 has, for example, a movable range from a position of the shaft 16 in a leftward rotation (FIG. 4A) to a position thereof in a rightward rotation (FIG. 4B). In addition, with respect to the axial center C1, the axial center C2 retaining the main shaft 16 has, for example, a movable range from a position of the center C2 in a leftward rotation (FIG. 6A) to a position thereof in a rightward rotation (FIG. 5B). Then, as shown in FIG. 6, the movable range of the main shaft 16 obtained by combining the above movable ranges is referred to as a movable range WA1 formed between a maximum radius Rmax as the maximum rotation radius D1max and a minimum radius Rmin as a minimum rotation radius D1min. In this case, entry of the main shaft 16 into the recessed portion 13d allows the minimum rotation radius D1min to have a value close to a shortest length (=L1−L2). Thus, the movable range is extended to a position closer to the axial center C1, as compared to a minimum rotation radius Dmin of the conventional robot (See FIG. 12). The movable range WA1 includes movable ranges WA1a and WA1b partitioned by a single-dotted chain line CL. The movable range WA1a shows a region where the main shaft 16 can reach when located at the center line or on a left side from the center line, and the movable range WA1b shows a region where the main shaft 16 can reach when located on a right side from the center line.

In general, in order to perform positioning control of the main shaft 16, the axial center C2 connected to each of the arms 13 and 15 is rotated only in a single direction with respect to the center line of the first arm 13 (namely, a one-armed system) to specify only one angle to be made by each of the axial centers C1 and C2 with respect to a locating position of the main shaft 16. This can make the positioning control thereof easier, that is, can specify a posture of the SCARA robot with respect to the locating position of the main shaft 16, thereby facilitating recognition of interference or the like occurring between the robot and another device.

Meanwhile, when the axial center C2 is rotated in opposite directions with respect to the center line of the first arm 13, there occurs a region requiring two postures for the robot with respect to the locating position of the main shaft 16. This makes the positioning control complicate and makes it difficult to recognize interference between the robot and another device. Accordingly, for the SCARA robot, operation by the one-armed system is of high utility value in view of controllability. In fact, movement of the SCARA robot is often controlled so as to work only in a moving range in accordance with the one-armed system operation.

In the embodiment, the movable range WA1a is referred to as a region of the main shaft 16 operating when the axial center C2 is rotated only leftward with respect to the center line of the first arm 13 (namely, a right-armed system). The movable range WA1a in the right-armed system operation corresponds to a region of a front side F and a left side with respect to the base 11. In other words, while a right region with respect to the base 11 is reduced by a curving amount of the first arm 13, a region including the left side and the rear side R of the base 11 is increased. The distribution of the movable range WA1a in the right-armed system is extremely effective in performing assembly operation using a mode of single-point supply and single-point incorporation, which is frequently required of a SCARA robot working on an assembly line. In the single-point supply and single-point incorporation, a component obtained from a single point is incorporated into a single point.

Figure 7:
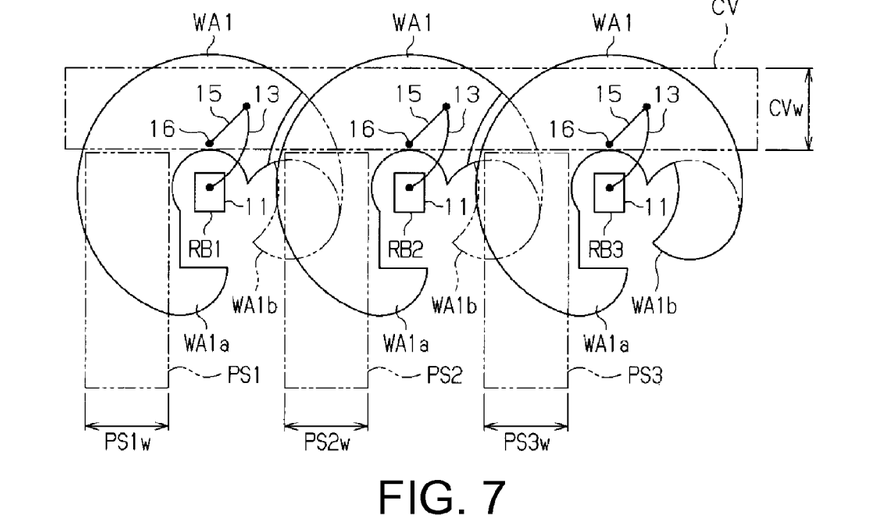
FIG. 7 is a layout view showing a layout example of the horizontal articulated robot of the first embodiment in a production facility.

For example, as shown in FIG. 7, robots RB1 to RB3 as a plurality of SCARA robots are sequentially placed side by side to each other, where a product conveyor CV is positioned on the front side F. In the movable range WA1 of each one of the robots, a region overlapping with a movable region of another one of the robots and a region beyond the overlapping region are reduced as compared to the conventional robot with the movable range WA (See FIG. 13). Particularly, in the robots RB1 to RB3, most of the movable range WA1a of one of the robots in the right-armed system having a high utility value do not overlap with the movable range WA1a of another one of the robots, so that the positioning control of the respective robots RB1 to RB3 is extremely highly flexible. When compared with the conventional SCARA robot as shown in FIG. 12, the arm length L11 of the conventional SCARA robot is referred to as the arm length L1 and the arm length L12 of the robot is referred to as the arm length L2.

In addition, as compared to the conventional movable range WA, a region width of the movable range WA1 (=Rmax−Rmin) is larger. Thereby, the product conveyor CV can have a larger conveyor width CVw and thus can convey larger-size products. In addition, regarding component supply devices PS1 to PS3 supplying a component to each of the robots RB1 to RB3 from a left side of the each robot, device widths PS1W to PS3W can be increased. Furthermore, for example, the number of components supplied each time can be increased by an amount of extension of the movable range WA to the rear side R.

As described above, the horizontal articulated robot of the embodiment provides advantageous effects as listed below.

1. The main shaft 16 has the rotation path in which the radius of rotation around the axial center C2 is equivalent to the arm length L2 of the second arm 15. The main shaft 16 is moved up to a position close to the center axis in such a manner that the main shaft 16 enters into the eccentric recessed portion 13d of the first arm. Thereby, the movable range WA1 of the main shaft 16 can be extended by the amount of reduction in the minimum rotation radius D1min of the main shaft 16 with respect to the axial center C1.

2. The arm lengths L1 and L2, respectively, of the first and the second arms, respectively, can be made equal to respective arm lengths of a SCARA robot having a non-eccentric conventional first arm. This can minimize an increase in mass of the first arm 13, and as the second arm 15, the conventional type of arm can be used as it is. As a result, in the horizontal articulated robot using the eccentric first arm 13, responsiveness, positioning precision and the like can be maintained as in the conventional robot. Thus, there is no unnecessary increase in robot size.

3. The main shaft 16 can be moved up to a position close to the center axis in such a manner that the shaft 16 enters into the recessed portion 13d as the curved portion of the first arm 13, thereby allowing the main shaft 16 to be smoothly stored in the curved shape of the first arm 13.

4. The movable range WA1 of the SCARA robot can be extended up to the rear side R of the base 11 when the axial center C2 of the first arm 13 is located in a rear direction corresponding to the rear side R of the SCARA robot while sandwiching the wiring duct 19 (the base-side duct connecting portion 20) between the axial centers C2 and C1. This can suitably extend the movable range of the first arm 13 in the SCARA robot in which the wiring duct 19 (the base-side duct connecting portion 20) is provided in a position interfering with the first arm 13 on the base 11.

Furthermore, the embodiment may be modified to be implemented, as in following examples.

In the embodiment, the main shaft 16 is located in the most recessed portion of the first arm 13. However, this is merely an example and the main shaft 16 may not be located in the most recessed portion of the first arm. The movable range of the main shaft 16 can be extended as long as the shaft 16 is located in even a least recessed portion. This can improve flexibility in the shape of the first arm.

In addition, in the embodiment, the base-side duct connecting portion 20 is also located in the most recessed portion of the first arm 13, but this may not be necessary. The movable range of the first arm 13 can be extended as long as the base-side duct connecting portion 20 is located in even a least recessed portion, thereby improving flexibility in the shape of the first arm 13.

In the embodiment, the connection shaft 12 and the support shaft 14, respectively, are inserted into the base end connection portion 31 and the extreme end connection portion 35, respectively, penetratingly formed on the first arm 13. The shafts 12 and 14 are connectively fixed to the respective portions by a screw or the like via a screw hole. However, this is merely an example, and connective fixation of the connection shaft and the support shaft to the first arm may be made by other manners. For example, the connection shaft and the support shaft may be connected to the first arm by a bolt as vertically penetrating through the first arm or by inserting the connection shaft and the support shaft, respectively, into a grooved base end connection portion and a grooved extreme end connection portion, respectively. This can improve flexibility in the structure of the first arm.

In the embodiment, the connection shaft 12 and the support shaft 14 can be connected to both of the top and the bottom surfaces of the first arm 13. However, instead of that, each of the shafts 12 and 14 may be connectable only to one of the top and the bottom surfaces of the first arm. This facilitates processing of the first arm.

In the embodiment, the main shaft 16 cannot be moved to a position overlapping with the center line, but alternatively, may be moved thereto. As the main shaft comes closer to the center line, the minimum rotation radius becomes smaller, whereby the movable range of the main shaft is extended. As a result, a movable range for working as the SCARA robot can be extended, so as to obtain a larger movable range.

In the embodiment, the first arm 13 has entirely the rightward-curved shape. This is merely an example of the shape of the first arm 13. The first arm 13 can have any other shape as long as the main shaft 16 can be located close to the center line of the first arm 13 in a position overlapping with the rotation path of the main shaft 16. For example, only a portion of the first arm 13 overlapping with the rotation path of the main shaft 16 may be horizontally protruded in a convex form or a horizontal width of the protruded portion may be made small to form only a horizontally recessed portion. This can increase flexibility in the shape of the first arm.

Figure 8:
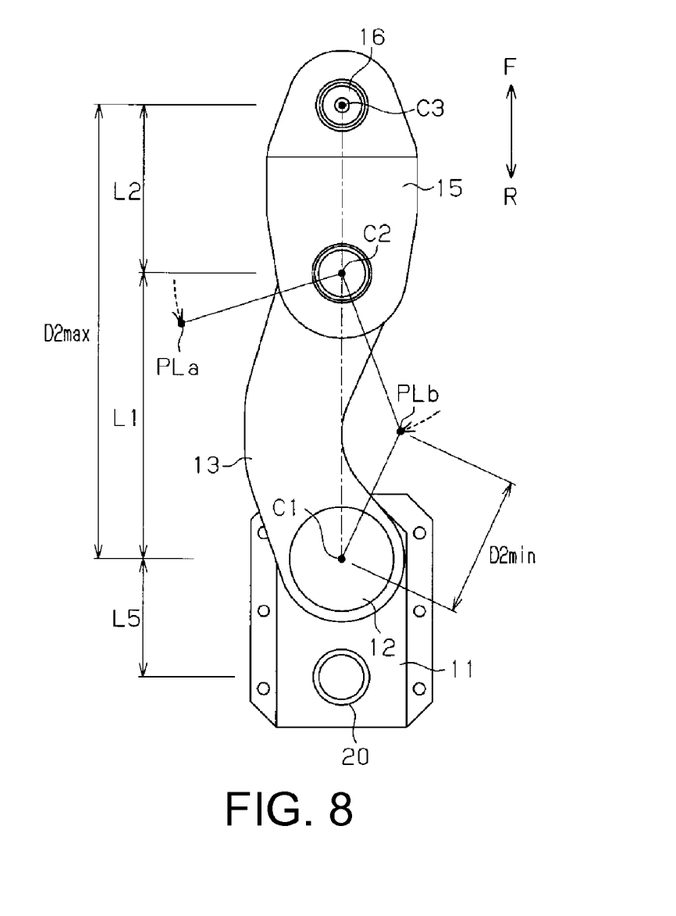
FIG. 8 is a plan view showing a top-surface structure of a horizontal articulated robot according to a second embodiment.
Figure 9A:
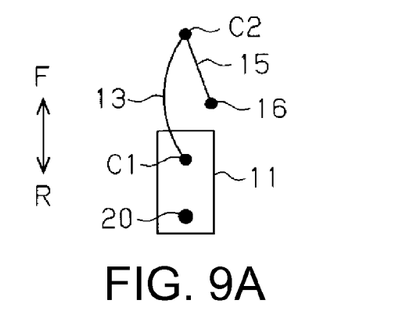
FIG. 9A is an illustrative view showing a movable range of a second arm of the horizontal articulated robot of the second embodiment when the second arm rotates clockwise.
Figure 9B:
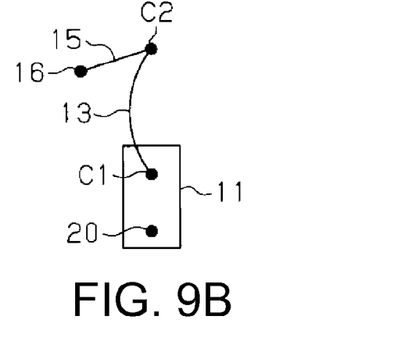
FIG. 9B is an illustrative view showing a movable range of the second arm of the horizontal articulated robot of the second embodiment when the second arm rotates counterclockwise.
Figure 10A:
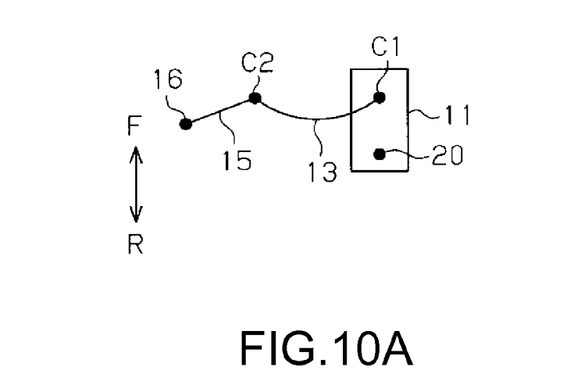
FIG. 10A an illustrative view showing a movable range of a first arm of the horizontal articulated robot of the second embodiment when the first arm rotates clockwise.
Figure 10B:
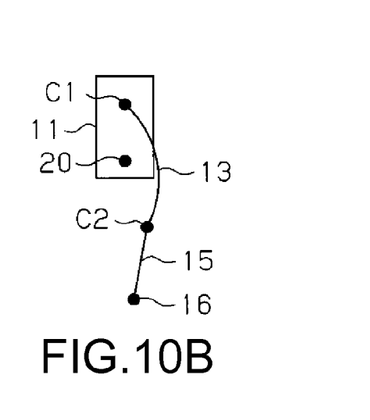
FIG. 10B is an illustrative view showing a movable range of the first arm of the horizontal articulated robot of the second embodiment when the first arm rotates counterclockwise.
Figure 11:
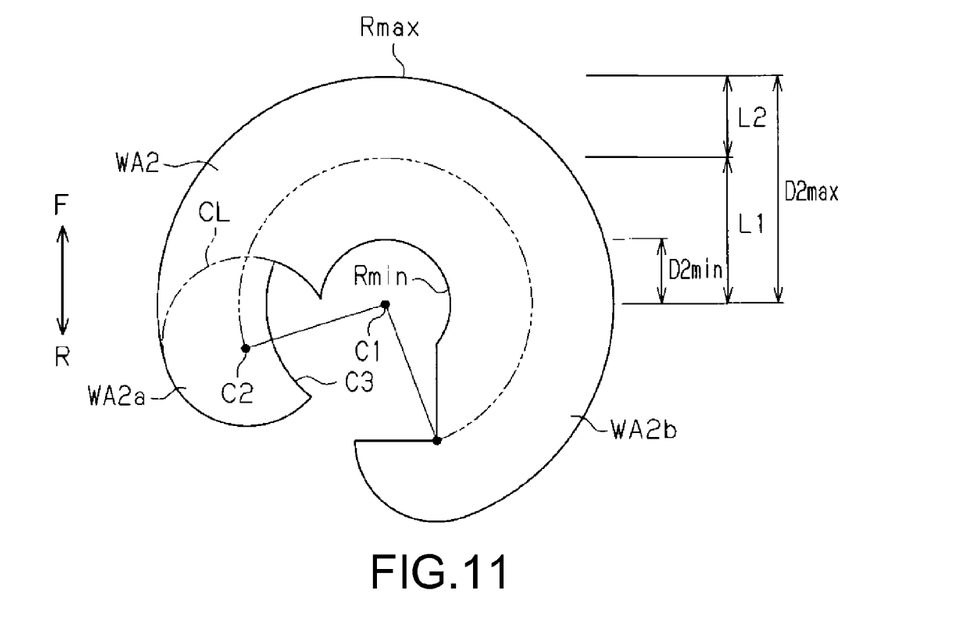
FIG. 11 is a regional view showing a planar path of each axis and a movable range of a main shaft in the horizontal articulated robot of the second embodiment.

In the embodiment, the first arm 13 is curved in the rightward bulging shape. However, alternatively, the first arm 13 may be curved in a leftward bulging shape. For example, as shown in FIG. 8, the SCARA robot has a maximum rotation radius D2max and a minimum rotation radius D2mix. However, when the arm length L1 is equal to the arm length L2, the values become equal to the maximum rotation radius D1max and the minimum rotation radius D1min of the embodiment. In this case, due to a difference of the curving direction in the first arm 13, the main shaft 16 has, for example, a movable range from a position in a rightward rotation (FIG. 9A) to a position in a leftward rotation (FIG. 9B), with respect to the axial center C2. In addition, with respect to the axial center C1, the axial center C2 retaining the main shaft 16 has, for example, a movable range from a position when rotated rightward (FIG. 10A) to a position when rotated leftward (FIG. 10B). Then, the movable range of the main shaft 16 including the movable ranges is referred to as a movable range WA2 formed between a maximum radius Rmax as a maximum rotation radius D2max and a minimum radius Rmin as a minimum rotation radius D2min, as shown in FIG. 11. In this case, similarly, the main shaft 16 enters into the recessed portion at a right limit point PLb to allow the minimum rotation radius D2min to have a value close to the shortest length (=L1−L2), thereby extending the movable range of the main shaft 16 in a position close to the axial center C1. The movable range WA2 includes movable ranges WA2b and WA2a partitioned by a single-dotted chain line CL. The movable range WA2b is referred to as a region reachable when the main shaft is located at a center line or on a right side from the center line (a left-armed system), and the movable range WA2a is referred to as a region reachable when the main shaft 16 is located on a left side from the center line. Thus, the movable range WA2b of the left-armed system corresponds to a region of the front side F and the right side with respect to the base 11. Due to easy positioning control and the like, the utility value can be improved. In addition, for the SCARA robot, configuration (structure) flexibility can also be improved.

What is claimed is:

1. A horizontal articulated robot, comprising:
    a base;
    a first arm provided rotatably around a first rotation axis on the base, the first arm being in a plate-like shape having a first horizontal surface and a second horizontal surface opposite to the first horizontal surface;
    a first connection shaft provided in the base, the first connection shaft protruding from the base, the first connection shaft rotating around the first rotation axis;
    a base end connection portion provided in the first arm so as to connect the first arm to the first connection shaft;
    a first protruded portion provided at the base end connection portion;

a second arm provided rotatably around a second rotation axis on the first arm, the second rotation axis being parallel to the first rotation axis;

a second connection shaft provided in the second arm, the second connection shaft protruding from the second arm, the second connection shaft rotating around the second rotation axis;

an extreme end connection portion provided in the first arm so as to connect the first arm to the second connection shaft;

a second protruded portion provided at the extreme end connection portion; and a main shaft provided in the second arm to be extended in a first direction parallel to the second rotation axis, wherein a distance between the second rotation axis and the main shaft is shorter than a length of a straight line connecting the first and the second rotation axes, the first arm has a recessed portion formed so as to include a position on a rotation path where a rotation radius around the second rotation axis is equivalent to the distance between the second rotation axis and the main shaft, the first protruded portion protrudes from the first arm toward the first rotation axis at a first center of a first thickness direction of the base end connection portion, the second protruded portion protrudes from the first arm toward the second rotation axis at a second center of a second thickness direction of the extreme end connection portion, and a cross section of the first arm taken along a plane which intersects the first and second centers is symmetrical with respect to a center line of the cross section which intersects the first and second protruded portions so that the first arm is positionable at the base in either a first state with the first horizontal surface above the second horizontal surface or a second state with the second horizontal surface above the first horizontal surface.

2. The horizontal articulated robot according to claim 1, wherein the recessed portion is formed by curving the first arm.

3. The horizontal articulated robot according to claim 1, wherein the first arm has the recessed portion at an intersection of the straight line and the rotation path in a rotation direction such that at least a part of the main shaft can be located on the intersection.

4. The horizontal articulated robot according to claim 1, wherein the base end connection portion is provided so as to be connectable to the first connection shaft on both of the first and second horizontal surfaces of the first arm, and the extreme end connection portion is provided so as to be connectable to the second connection shaft on both of the first and second horizontal surfaces of the first arm.

5. The horizontal articulated robot according to claim 1 further includes a wiring duct provided on the base to store wiring, the wiring duct being located in a position interfering with the recessed portion of the first arm rotated.

* * * * *